US012126653B2

(12) United States Patent
Anderson et al.

(10) Patent No.: US 12,126,653 B2
(45) Date of Patent: *Oct. 22, 2024

(54) DETECTING TARGETED DATA EXFILTRATION IN ENCRYPTED TRAFFIC

(71) Applicant: Cisco Technology, Inc., San Jose, CA (US)

(72) Inventors: Blake Harrell Anderson, Chapel Hill, NC (US); Chris Allen Shenefiel, Williamsburg, VA (US); David McGrew, Poolesville, MD (US); Robert M. Waitman, Suffern, CA (US)

(73) Assignee: Cisco Technology, Inc., San Jose, CA (US)

( * ) Notice: Subject to any disclaimer, the term of this patent is extended or adjusted under 35 U.S.C. 154(b) by 517 days.

This patent is subject to a terminal disclaimer.

(21) Appl. No.: 17/107,350

(22) Filed: Nov. 30, 2020

(65) Prior Publication Data

US 2021/0112102 A1    Apr. 15, 2021

Related U.S. Application Data

(63) Continuation of application No. 16/017,482, filed on Jun. 25, 2018, now Pat. No. 10,868,834.

(Continued)

(51) Int. Cl.
*H04L 9/40*    (2022.01)
*G06N 20/00*   (2019.01)

(52) U.S. Cl.
CPC .............. *H04L 63/20* (2013.01); *H04L 63/10* (2013.01); *H04L 63/1416* (2013.01);

(Continued)

(58) Field of Classification Search
CPC ..... H04L 63/20; H04L 63/10; H04L 63/1416; H04L 63/166; H04L 63/145;

(Continued)

(56) References Cited

U.S. PATENT DOCUMENTS 9,246,948 B2    1/2016 Jaiswal et al.
9,565,202 B1    2/2017 Kindlund et al.

(Continued)

FOREIGN PATENT DOCUMENTS

| | | |
|---|---|---|
| EP | 2713570 A1 | 4/2014 |
| EP | 3306890 A1 | 4/2018 |
| WO | WO-2019179625 A1 * | 9/2019 |

OTHER PUBLICATIONS

British Search Report issued on Mar. 17, 2022, in connection with British Patent Application No. GB1908422.7.

(Continued)

*Primary Examiner* — Mohammad W Reza
(74) *Attorney, Agent, or Firm* — BEHMKE INNOVATION GROUP LLC; James M. Behmke; Keith O. Mitchell

(57) ABSTRACT

In one embodiment, a service that monitors a network obtains file characteristic data of a file stored on a first endpoint in the network. The service infers characteristics of encrypted content within encrypted traffic in the network between the first endpoint and a second endpoint, by applying a machine learning-based classifier to traffic data regarding the encrypted traffic session. The service compares the file characteristic data of the file to the inferred content characteristics of the encrypted content within the encrypted traffic, to detect the file within the encrypted traffic. The service enforces a network policy in the network, based on the detection of the file within the encrypted traffic.

20 Claims, 15 Drawing Sheets

Related U.S. Application Data

(60) Provisional application No. 62/670,195, filed on May 11, 2018.

(52) U.S. Cl.
CPC .............. *H04L 63/166* (2013.01); *G06N 20/00* (2019.01); *H04L 63/145* (2013.01); *H04L 63/1458* (2013.01)

(58) Field of Classification Search
CPC .............. H04L 63/1458; H04L 41/0894; H04L 41/142; H04L 41/16; G06N 20/00
See application file for complete search history.

(56) References Cited

U.S. PATENT DOCUMENTS

| | | | |
|---|---|---|---|
| 9,641,544 B1 | 5/2017 | Treat | |
| 10,404,663 B1* | 9/2019 | Petrukhin | H04L 69/329 |
| 10,664,574 B1* | 5/2020 | Powers | G06F 21/6218 |
| 10,891,375 B1* | 1/2021 | Stolfo | G06F 16/248 |
| 2007/0073808 A1* | 3/2007 | Berrey | G06Q 10/10 |
| | | | 709/204 |
| 2017/0091482 A1 | 3/2017 | Sarin et al. | |
| 2017/0279833 A1 | 9/2017 | Vasseur et al. | |
| 2017/0353501 A1 | 12/2017 | Lau et al. | |
| 2018/0103056 A1 | 4/2018 | Kohout et al. | |
| 2018/0139141 A1 | 5/2018 | Stepanek et al. | |
| 2018/0254906 A1* | 9/2018 | Tofts | G06F 21/53 |
| 2019/0058734 A1 | 2/2019 | Xu | |
| 2020/0050760 A1* | 2/2020 | El-Moussa | H04L 63/145 |
| 2020/0374336 A1* | 11/2020 | Murgia | H04L 47/2491 |

OTHER PUBLICATIONS

Jett, Justin., "Detecting Data Exfiltration with NetFlow and Packet Capture", https://www.plixer.com/blog/detect-network-threats/detecting-data-exfiltration-netflow-packet-capture, 4 pages, Oct. 13, 2017, Plixer, LLC.

Liu, et al., "SIDD: A Framework for Detecting Sensitive Data Exfiltration by an Insider Attack", 42nd Hawaii International Conference on System Sciences, 2009. HICSS '09, pp. 1-10, 2009, IEEE.

Patterson, Michael., "Cisco Cyber Threat Defense : 4 Tell-Tale Signs of Data Exfiltration", Cisco Communities, https://communities.cisco.com/people/mikeplixer/blog/2014/05/17/cisco-cyber-threat-defense-4-tell-tale-signs-of-data-exfiltration, 2 pages, May 17, 2014, Cisco.

Silowash, et al., "Detecting and Preventing Data Exfiltration Through Encrypted Web Sessions via Traffic Inspection", Technical Note CMU/SEI-2013-TN-012, Cert Program, http://www.sei.cmu.edu, 67 pages, 2013, Carnegie Mellon University.

"Data Loss Prevention (DLP)—Products", https://www.zscaler.com/products/data-loss-prevention, 6 pages, Accessed on Apr. 25, 2018, Zscaler, Inc.

Search report dated Mar. 11, 2020 in connection with British Application No. GB1908422.7.

Velan, Petr et al.: "A survey of methods for encrypted traffic classification and analysis", International Journal of Network Management, vol. 25, pp. 355-374, Jul. 15, 2015.

Cheng, Guang et al.: Encrypted Traffic Identification Based on N-gram Entropy and Cumulative Sum Test, CFI 2018: The 13th International Conference on Future Internet Technologies, Jun. 20-22, 2018, Seoul, Republic of Korea.

\* cited by examiner

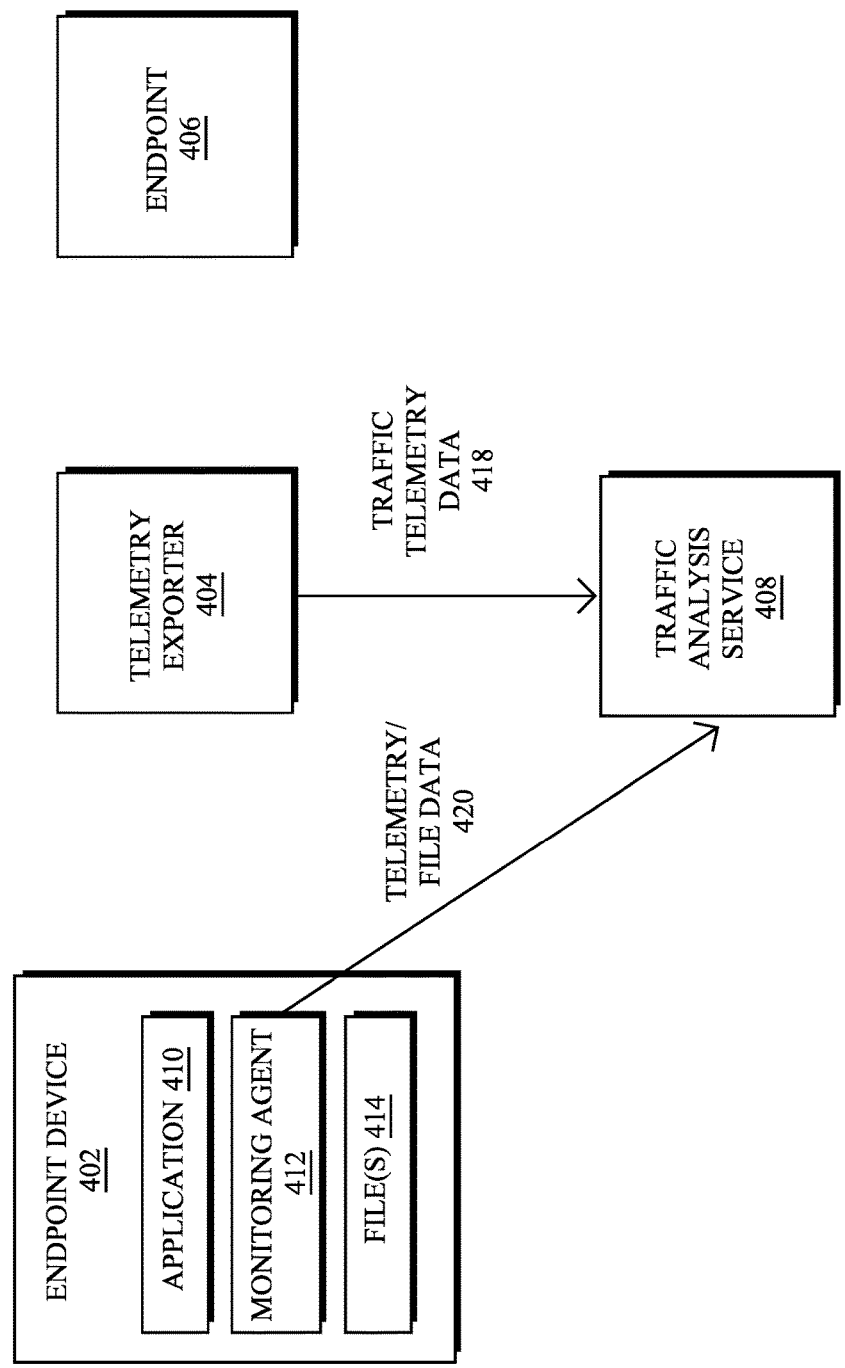

DETECTING TARGETED DATA EXFILTRATION IN ENCRYPTED TRAFFIC

CROSS-REFERENCES TO RELATED APPLICATIONS

This application is a Continuation of U.S. patent application Ser. No. 16/017,482, filed on Jun. 25, 2018, entitled DETECTING TARGETED DATA EXFILTRATION IN ENCRYPTED TRAFFIC, by Anderson, et al., and claims priority to U.S. Provisional Patent Application No. 62/670,195, filed on May 11, 2018, entitled "DETECTING TARGETED DATA EXFILTRATION IN ENCRYPTED TRAFFIC," by Anderson, et al., the contents of which are incorporated herein by reference.

TECHNICAL FIELD

The present disclosure relates generally to computer networks, and, more particularly, to detecting targeted data exfiltration in encrypted traffic in a computer network.

BACKGROUND

Enterprise networks are carrying a very fast growing volume of both business and non-business critical traffic. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

Beyond the various types of legitimate application traffic in a network, some network traffic may also be malicious. For example, some traffic may seek to overwhelm a service by sending a large number of requests to the service. Such attacks are also sometimes known as denial of service (DoS) attacks. Other forms of malicious traffic may seek to exfiltrate sensitive information from a network, such as credit card numbers, trade secrets, and the like. Typically, such traffic is generated by a client that has been infected with malware. Thus, further types of malicious network traffic include network traffic that propagate the malware itself and network traffic that passes control commands to already infected devices. However, many instances of malware now use encryption, to conceal their network activity from detection.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 4A-4C illustrate an example of correlating endpoint and network views to detect data exfiltration in encrypted data;

DESCRIPTION OF EXAMPLE EMBODIMENTS

Overview

Figure 1A:
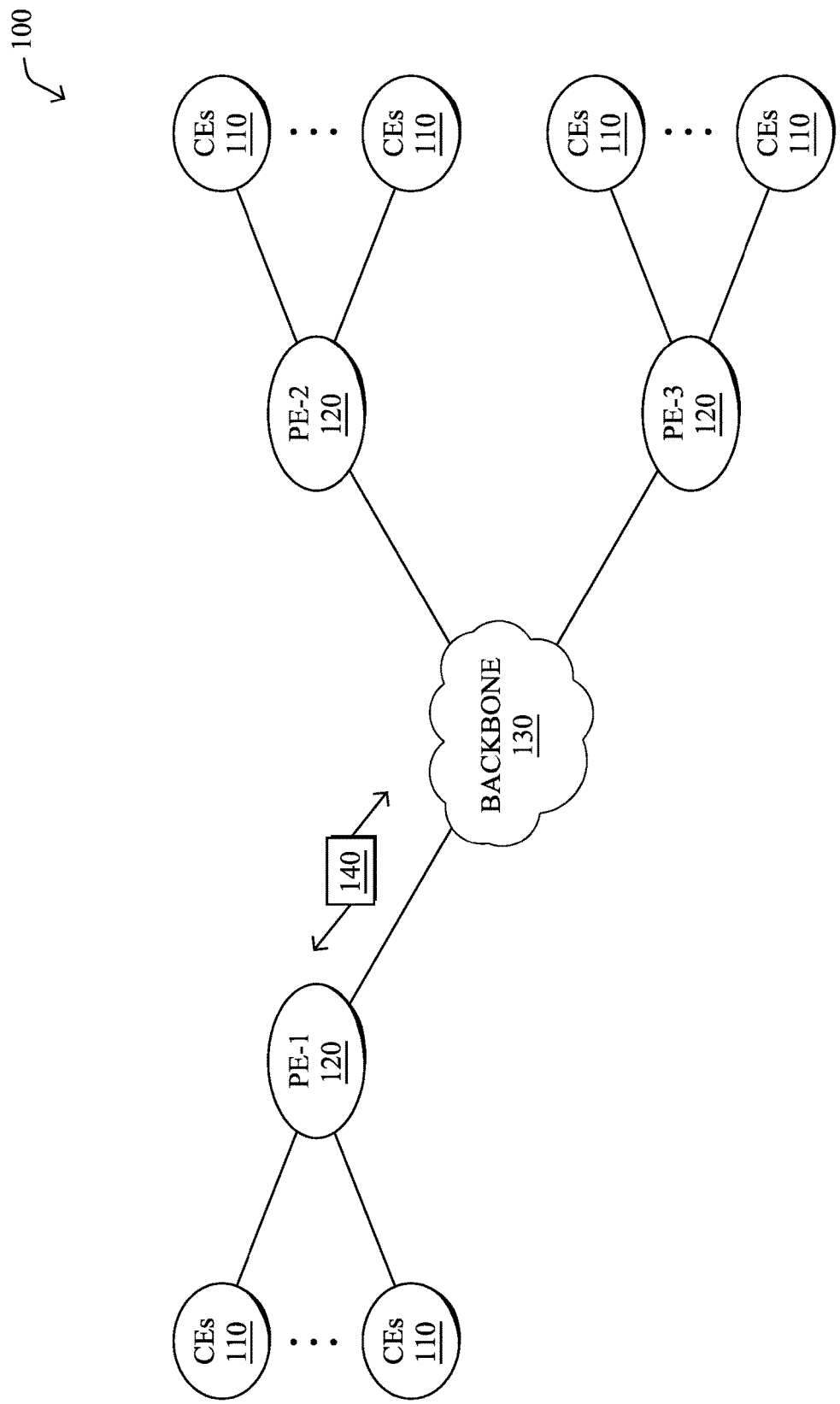
FIGS. 1A-1B illustrate an example communication network.

According to one or more embodiments of the disclosure, a service that monitors a network obtains file characteristic data of a file stored on a first endpoint in the network. The service infers characteristics of encrypted content within encrypted traffic in the network between the first endpoint and a second endpoint, by applying a machine learning-based classifier to traffic data regarding the encrypted traffic session. The service compares the file characteristic data of the file to the inferred content characteristics of the encrypted content within the encrypted traffic, to detect the file within the encrypted traffic. The service enforces a network policy in the network, based on the detection of the file within the encrypted traffic.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.
2.) Site Type B: a site connected to the network using two MPLS VPN links (e.g., from different service providers), with potentially a backup link (e.g., a 3G/4G/LTE connection). A site of type B may itself be of different types:
2a.) Site Type B1: a site connected to the network using two MPLS VPN links (e.g., from different service providers), with potentially a backup link (e.g., a 3G/4G/LTE connection).
2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.
2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
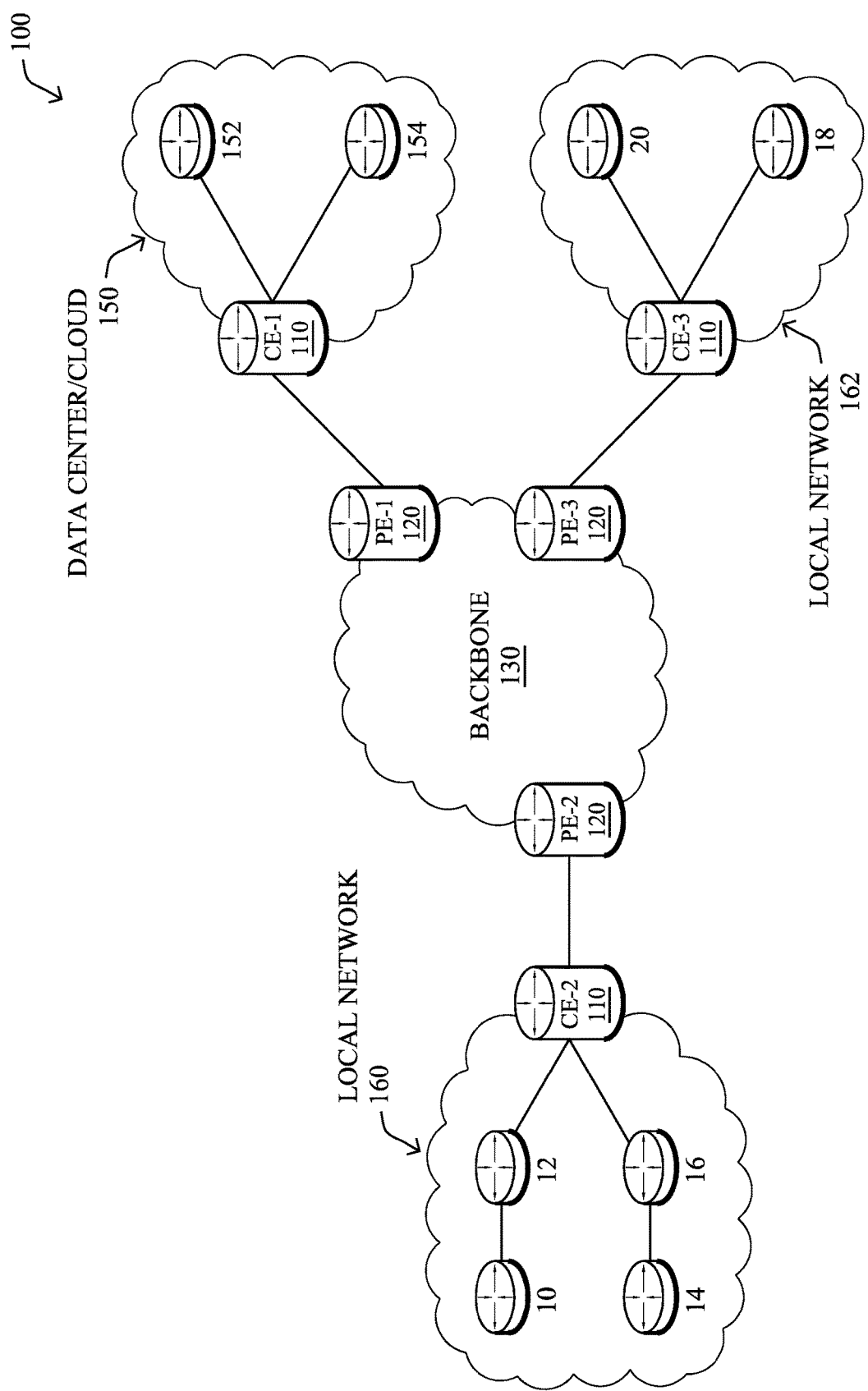

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
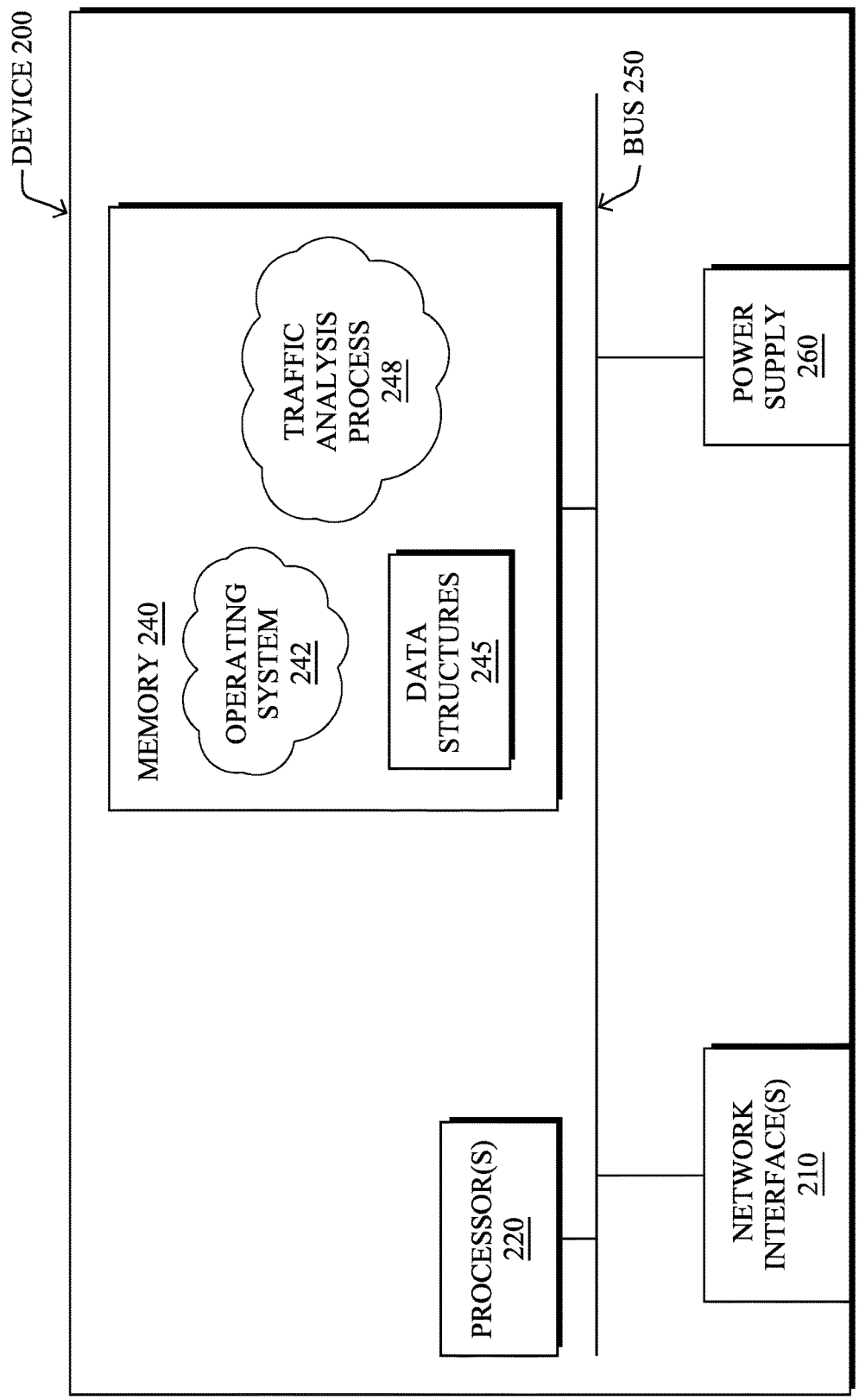
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a traffic analysis process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, traffic analysis process 248 may execute one or more machine learning-based classifiers to classify encrypted traffic in the network (and its originating application) for any number of purposes. In one embodiment, traffic analysis process 248 may assess captured telemetry data regarding one or more traffic flows, to determine whether a given traffic flow or set of flows are caused by malware in the network, such as a particular family of malware applications. Example forms of traffic that can be caused by malware may include, but are not limited to, traffic flows reporting exfiltrated data to a remote entity, spyware or ransomware-related flows, command and control (C2) traffic that oversees the operation of the deployed malware, traffic that is part of a network attack, such as a zero day attack or denial of service (DoS) attack, combinations thereof, or the like. In further embodiments, traffic analysis process 248 may classify the gathered telemetry data to detect other anomalous behaviors (e.g., malfunctioning devices, misconfigured devices, etc.), traffic pattern changes (e.g., a group of hosts begin sending significantly more or less traffic), or the like.

Traffic analysis process 248 may employ any number of machine learning techniques, to classify the gathered telemetry data. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, traffic analysis 248 can use the model M to classify new data points, such as information regarding new traffic flows in the network. Often, M is a statistical model, and the cost function is inversely proportional to the likelihood of M, given the input data.

In various embodiments, traffic analysis process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is "normal," or "malware-generated." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that traffic analysis process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as malware-generated, anomalous, etc. Conversely, the false negatives of the model may refer to the number of traffic flows that the model incorrectly classifies as normal, when actually malware-generated, anomalous, etc. True negatives and positives may refer to the number of traffic flows that the model correctly classifies as normal or malware-generated, etc., respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, traffic analysis process 248 may assess the captured telemetry data on a per-flow basis. In other embodiments, traffic analysis 248 may assess telemetry data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Figure 3:
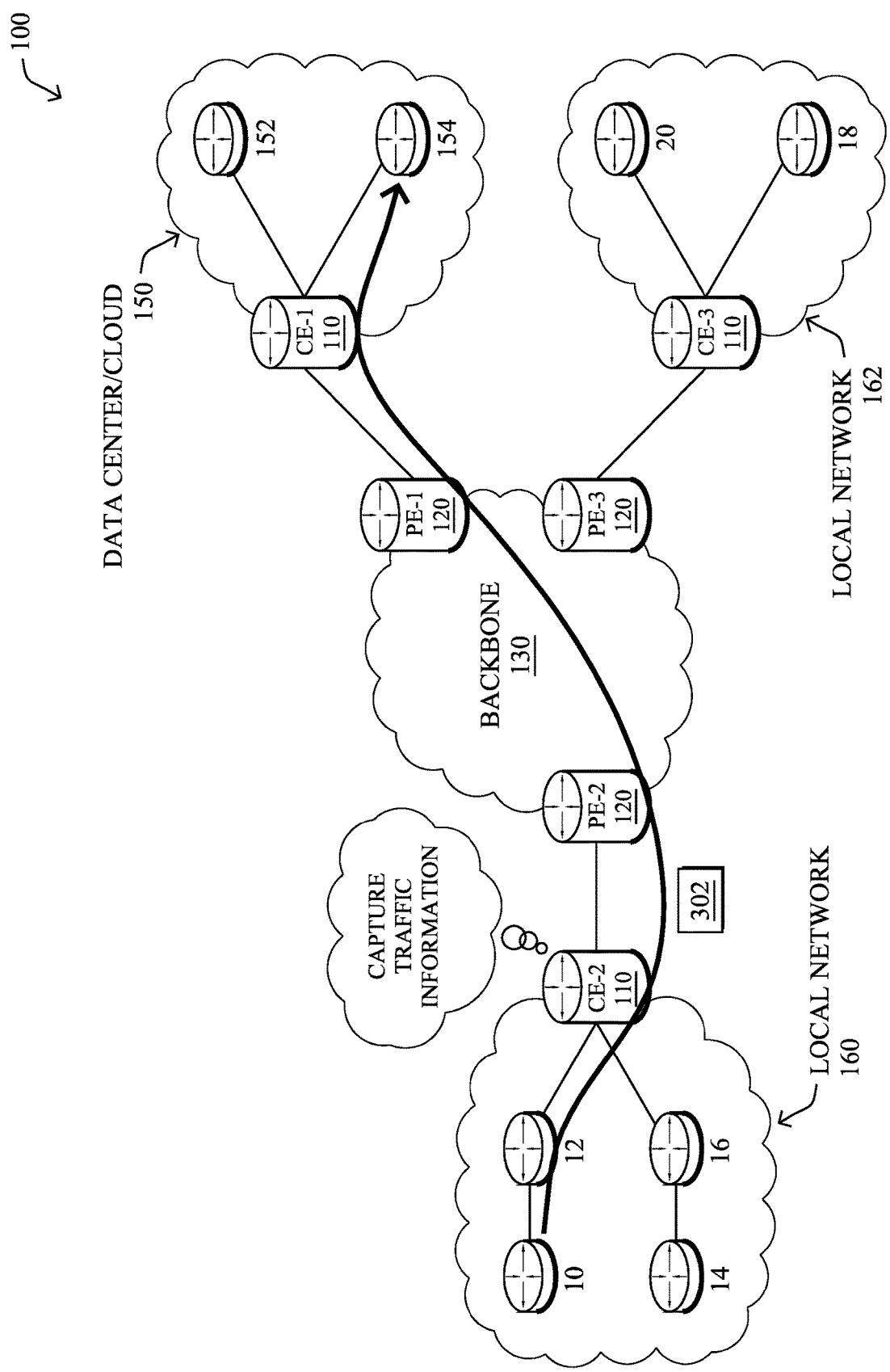
FIG. 3 illustrates an example of a device capturing traffic information.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture feature information about the traffic flow. For example, router CE-2 may capture the source address and/or port of host node 10, the destination address and/or port of server 154, the protocol(s) used by packet 302, or other header information by analyzing the header of a packet 302. Example captured features may include, but are not limited to, Transport Layer Security (TLS) information (e.g., from a TLS handshake), such as the ciphersuite offered, user agent, TLS extensions (e.g., type of encryption used, the encryption key exchange mechanism, the encryption authentication type, etc.), HTTP information (e.g., URI, etc.), Domain Name System (DNS) information, or any other data features that can be extracted from the observed traffic flow(s).

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.). However, as would be appreciated, a traffic flow may also be encrypted, thus preventing the device from assessing the actual payload of the packet. In such cases, the characteristics of the application can instead be inferred from the captured header information.

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302. In further examples, the capturing device may capture sequence of packet lengths and time (SPLT) data regarding the traffic flow, sequence of application lengths and time (SALT) data regarding the traffic flow, or byte distribution (BD) data regarding the traffic flow.

As noted above, data exfiltration represents one form of malicious activity in a network. In general, Data Loss Prevention (DLP) systems attempt to assign a classification score to documents indicating the sensitivity of documents in a network, and then identify when documents are transferred in a way that violates a pre-defined policy. For example, one policy violation may be uploading Personally Identifiable Information (PII), or a document containing PII, to a public folder of a cloud-based document sharing or collaboration service, where there are insufficient controls and measures to adequately protect the PII.

DLP systems typically rely on either an agent that has full access to the documents on the cloud-hosted application, or takes advantage of a TLS termination proxy to scan the contents as they traverse the network. In the case of an employee with malicious intent, it would be unlikely that they upload the documents to servers instrumented by the enterprise, and previous systems would therefore not be able to scan the document post-upload. In many countries, it is also against the law to decrypt traffic relating to a personal correspondence, which is what TLS-encrypted connections to mail or chat servers resemble. TLS termination proxies can also fail because of technical challenges.

Detecting Targeted Data Exfiltration in Encrypted Traffic

The techniques herein allow for the identification of protected/sensitive files within encrypted network traffic, without the need for a TLS termination proxy or relying solely on instrumented clients and servers. In some aspects, an agent executed by a device hosting a sensitive file may collect and report information regarding the file (e.g., its file size, name, etc.) to a traffic analysis service. In further aspects, the traffic analysis service may assess encrypted traffic in the network using machine learning, to identify the HTTP message types within an encrypted tunnel, and post-process this information with a set of rules to extract the size of the transferred file. By correlating the learned file information from the endpoint to the encrypted traffic information, the traffic analysis service is able to determine whether the traffic includes the sensitive file. In turn, the service may apply any number of rules, to determine whether this is a security violation and, if so, cause the performance of any number of mitigation actions in the network (e.g., sending an alert to a system administrator, blocking the encrypted traffic, etc.).

Specifically, according to one or more embodiments of the disclosure as described in detail below, a service that monitors a network obtains file characteristic data of a file stored on a first endpoint in the network. The service infers characteristics of encrypted content within encrypted traffic in the network between the first endpoint and a second endpoint, by applying a machine learning-based classifier to traffic data regarding the encrypted traffic session. The service compares the file characteristic data of the file to the inferred content characteristics of the encrypted content within the encrypted traffic, to detect the file within the encrypted traffic. The service enforces a network policy in the network, based on the detection of the file within the encrypted traffic.

Illustratively, the techniques described herein may be performed by hardware, software, and/or firmware, such as in accordance with the traffic analysis process 248, which may include computer executable instructions executed by the processor 220 (or independent processor of interfaces 210) to perform functions relating to the techniques described herein.

Operationally, in various embodiments, a set of known file characteristics (e.g., file sizes, etc.) of sensitive documents can be compared to file characteristics inferred from encrypted network traffic, to determine whether the traffic includes exfiltrated data. The set of known file characteristics to monitor can either come from an endpoint agent (e.g., Advanced Malware Protection (AMP) by Cisco Systems, Inc., etc.), or from a cloud monitoring application (e.g., Intelligent Context Aware Monitoring (iCAM) by Cisco Systems, Inc., etc.). In the case of an endpoint agent, a set of files can be directly associated with a specific endpoint. In the case of a cloud monitoring application, its logs can be used to associate a file with endpoints that downloaded that file. In either case, a set of file characteristics, such as file sizes and names, can be associated with a specific endpoint.

Figure 4A:
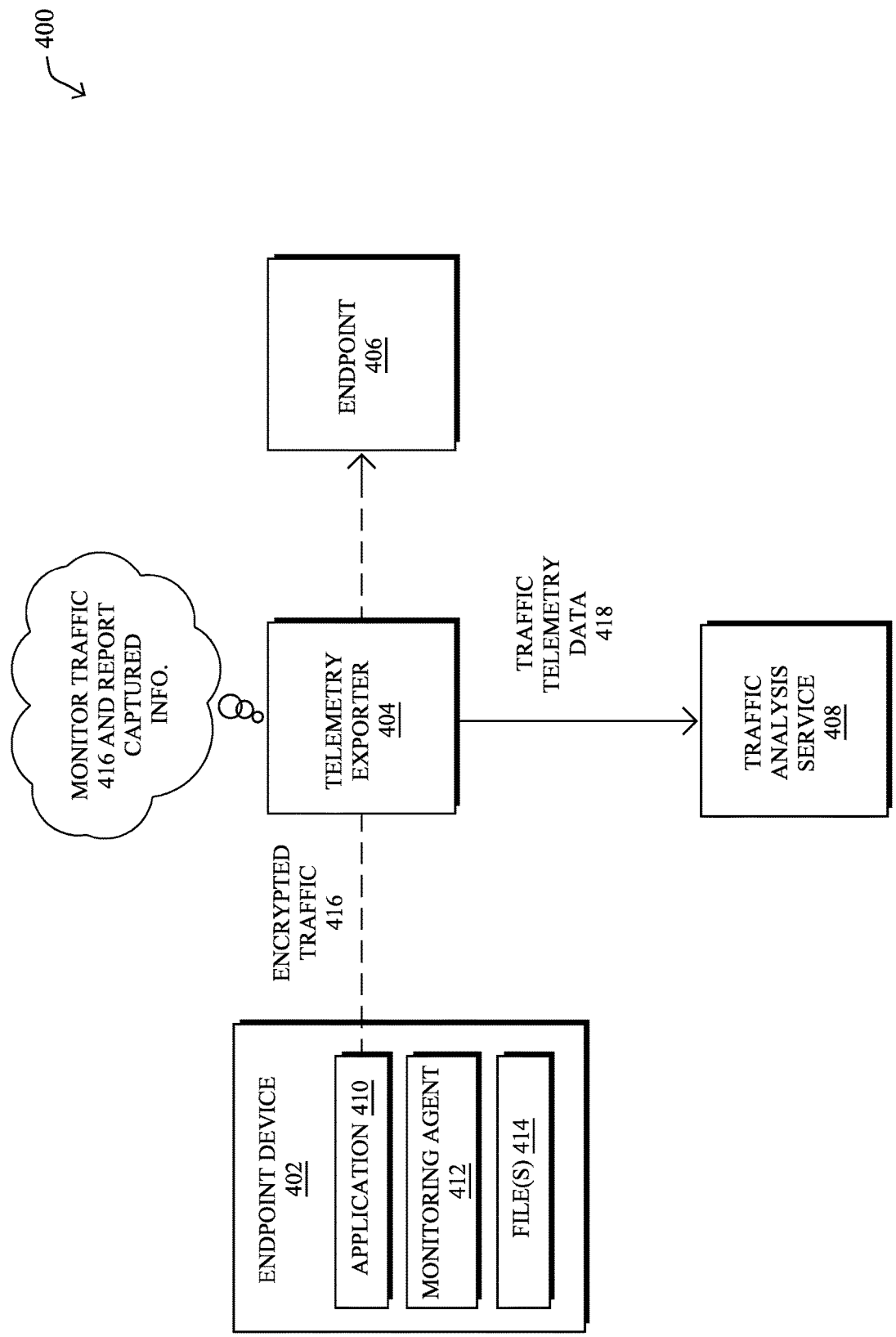
Figure 4C:
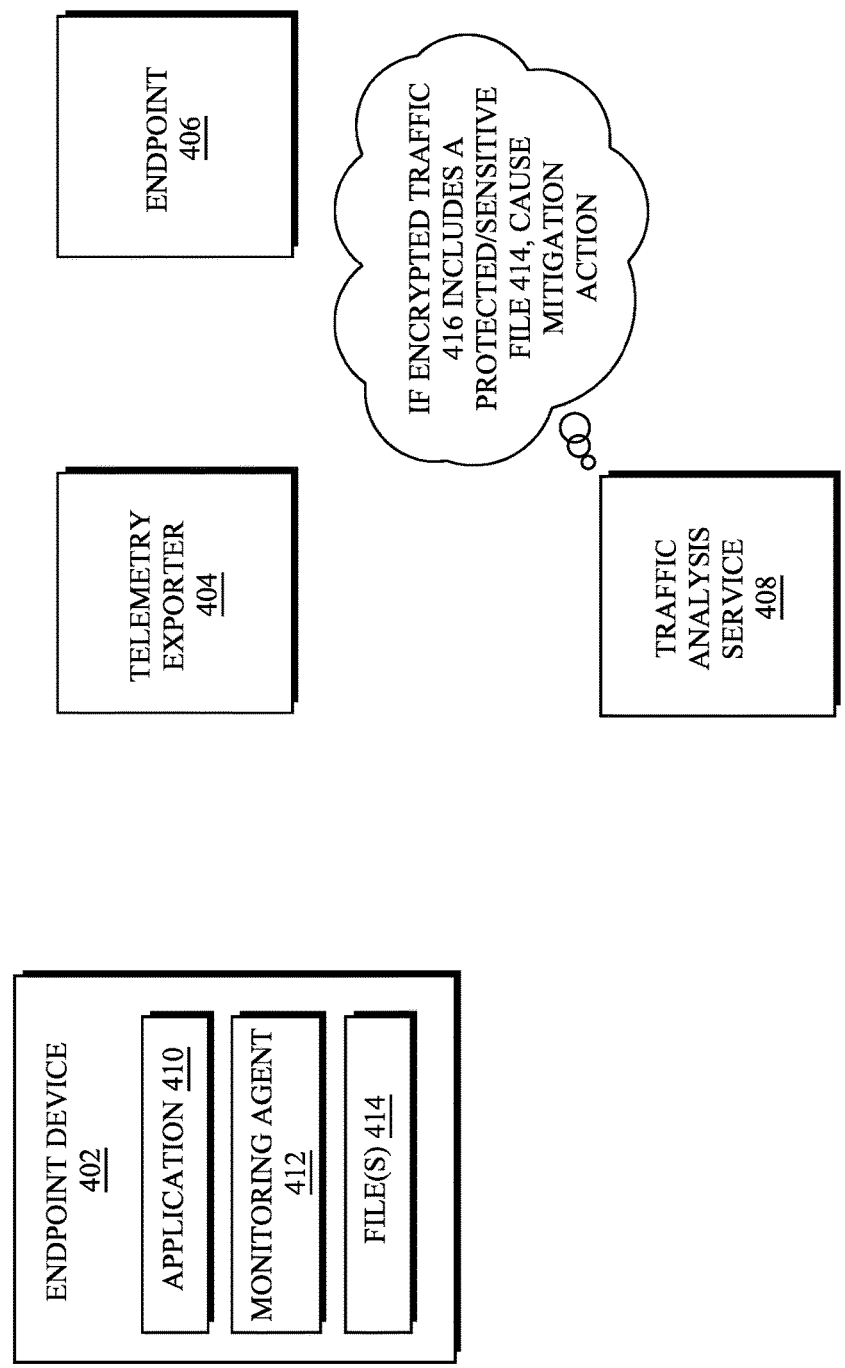

FIGS. 4A-4C illustrate an example of correlating endpoint and network views to detect data exfiltration in encrypted data, according to various embodiments. As shown in FIG. 4A, assume that a network 400 includes an endpoint device 402 that communicates with another remote endpoint 406. For example, in many cases, endpoint device 402 may be a client device that communicates with a remote server or service via network 400. In further cases, remote endpoint 406 may also be part of the network in which endpoint device 402 is located. More specifically, during operation, endpoint device 402 may execute an application 410 that generates and exchanges encrypted traffic 416 with endpoint 406 via network 400. In some cases, application 410 may send one or more local files 414 of endpoint 402 towards remote endpoint 406 via encrypted traffic 416.

Located along the network path between endpoint device 402 and endpoint 406 may be any number of telemetry exporters, such as telemetry exporter 404 shown. For example, telemetry exporter 404 may be a switch, router, firewall, server, network controller, or other networking equipment via which encrypted traffic 416 sent between endpoint device 402 end endpoint 406 flows. During operation, traffic telemetry exporter 404 may capture data regarding encrypted traffic 416, generate traffic telemetry data 418 based on the captured data, and send traffic telemetry data 418 to traffic analysis service 408 for assessment. For example, traffic telemetry data 418 may include Internet Protocol Flow Information Export (IPFIX) records and/or Netflow records regarding encrypted traffic 416.

In various embodiments, network 400 may also include a traffic analysis service 408 that is implemented by one or more devices in network 400 through the execution of traffic analysis process 248. For example, in some cases, traffic analysis service 408 may be implemented by one or more devices in the local network of endpoint device 402 (e.g., on the same device as telemetry exporter 404 or a device in communication therewith). However, in further cases, traffic analysis service 408 may be implemented as a cloud service that is in communication with telemetry exporter 404 and endpoint device 402, either directly or indirectly.

According to various embodiments, in addition to executing application 410, endpoint device 402 may also execute a monitoring agent 412 that monitors the local operations of endpoint device 402. More specifically, monitoring agent 412 may capture application telemetry data regarding the execution and operation of application 410 on endpoint device 402. For example, monitoring agent 412 may calculate a process hash fingerprint of application 410, may capture information regarding the libraries used by application 410, and/or may capture traffic information regarding encrypted traffic 416, such as size or timing information for the packets of encrypted traffic 416, or the like. In further embodiments, monitoring agent 412 may capture file characteristic information regarding one or more files 414 on endpoint 402, such as their sizes, Example monitoring applications that may be suitable for performing the tasks herein may include, but are not limited to, AnyConnect Network Visibility Module (NVM) by Cisco Systems, Inc., Advanced Malware Protection (AMP) by Cisco Systems, Inc., Application Performance Management by AppDynamics, certain monitoring functions of the resident operating system, and other suitable monitoring functions.

As shown in FIG. 4B, traffic analysis service 408 may also receive telemetry/file data 414 from monitoring agent 412. In some embodiments, monitoring agent 412 may supply telemetry/file data 414 to traffic analysis service 408 directly. In other embodiments, monitoring agent 412 may receive telemetry/file data 414 indirectly from endpoint device 402, such as via an application monitoring service in communication with monitoring agent 412. In addition, telemetry/file data 414 may be provided by monitoring agent 412 on either a push or pull basis. For example, in some cases, monitoring agent 412 may first send a request to monitoring agent 412 (either directly or indirectly) and, in response, monitoring agent 412 may send application telemetry/file data 414 to traffic analysis process 410. In general, telemetry/file data 414 may include information regarding the operations of application 410 (e.g., the packets generated by application 410, the hash of application 410, etc.) and/or file information for one or more files 414 located on endpoint device 402 (e.g., file size, file hash, file name, file location, etc.).

In FIG. 4C, in various embodiments, traffic analysis service 408 may correlate the file data 420 from monitoring agent 412 on endpoint 402 with the traffic telemetry data 418 captured by telemetry exporter 404 regarding encrypted traffic 416, to identify a specific one of file(s) 414 within encrypted traffic 416. As would be appreciated, the techniques herein can be performed on encrypted traffic 416 without actually decrypting encrypted traffic 416. This is in contrast to other approaches that require a proxy to act as a man-in-the-middle and actually encrypt the traffic.

In various embodiments, once the specific file 414 has been identified within encrypted traffic 416, traffic analysis service 408 may make a policy determination regarding the sending of the file to endpoint 406. Such a determination may be based on any or all of the following factors:

A manually set protected/sensitive flag associated with the file 414.
The name of the file 414 (e.g., "Account Information-.docx," etc.).
The location of the file 414 on endpoint device 402 (e.g., in a folder flagged as protected/sensitive).
A user associated with endpoint device 402.
A user associated with endpoint device 406.
A device type associated with endpoint device 402.
A device type associated with endpoint device 406.

In some cases, traffic analysis service 408 may simply enforce a policy that the file 414 is restricted from being sent anywhere by endpoint device 402. However, more complex policies could limit the dissemination of the file to certain sets of users or devices. For example, traffic analysis service 408 may correlate the sensitivity score of the file with information about the type of endpoint 402, to customize the policy (e.g., the alarm threshold could be lowered for IoT devices or other host groups in the network). In another example, the file sensitivity score could be correlated with the user information (e.g., a CEO/CTO could have a more lenient policy because they are expected to share some sensitive documents with partners). In yet another example, traffic analysis service 408 may correlate the document type, user(s), and endpoint information to effect a given policy (e.g., an engineer with access to sensitive code repositories may have a reduced alarm threshold when transferring those repositories to external servers). In a further embodiment, another potential factor to compute the sensitivity score of the file may be whether malware is detected on endpoint 402. Notably, the presence of malware may greatly increase the chances that the file being sent via an encrypted session for malicious purposes, such as data exfiltration.

When traffic analysis service 408 determines that a policy violation has occurred (e.g., that a file is being exfiltrated), traffic analysis service 408 may cause any number of mitigation actions to occur in the network. In one embodiment, traffic analysis service 408 may block the encrypted connection. For example, in FIG. 4C, traffic analysis service 408 may cause the networking device(s) conveying encrypted traffic 416 between endpoint devices 402 and 406 to perform a mitigation action, such as blocking traffic 416, slowing traffic 416, redirecting traffic 416, etc. In another embodiment, traffic analysis service 408 may block all traffic involving either or both of endpoint devices 402 and 406. In a further embodiment, traffic analysis service 408 may generate and send an alert, such as a security alert to a network administrator or other expert.

To infer the file size from an encrypted tunnel possibly containing many multiplexed or pipelined HTTP requests and responses, traffic analysis service 408 may include one or more machine learning-based classifiers, in various embodiments. For example, in one embodiment, traffic analysis service 408 may comprise a multi-class classifier for both HTTP/1 and HTTP/2. In both cases, the feature set used for the classification may include any or all of the following: the TLS record lengths, times, types, etc. and/or the TCP flags, lengths, times, etc. of the window of packets or records surrounding the observed encrypted traffic. For HTTP/2, the classification label set may include the HTTP/2 frame types of the TLS encrypted frames, e.g., HEADERS, DATA, SETTINGS, etc. For HTTP/1, the classification label set may include: request, response, and body.

Training of the classifier(s) of traffic analysis service 408 may entail using a training dataset that includes both encrypted traffic patterns and the labeled, decrypted contents of the TLS connections. Notably, packet captures and their relevant key material can be used to construct a training dataset that can be used to train a classifier to infer and label the contents of encrypted traffic based on the observed features of the encrypted traffic. In turn, file transfers can be identified using the HTTP[S] inferences, thus avoiding mis-identifying non-file transfer events as potential file transfers.

Figure 5A:
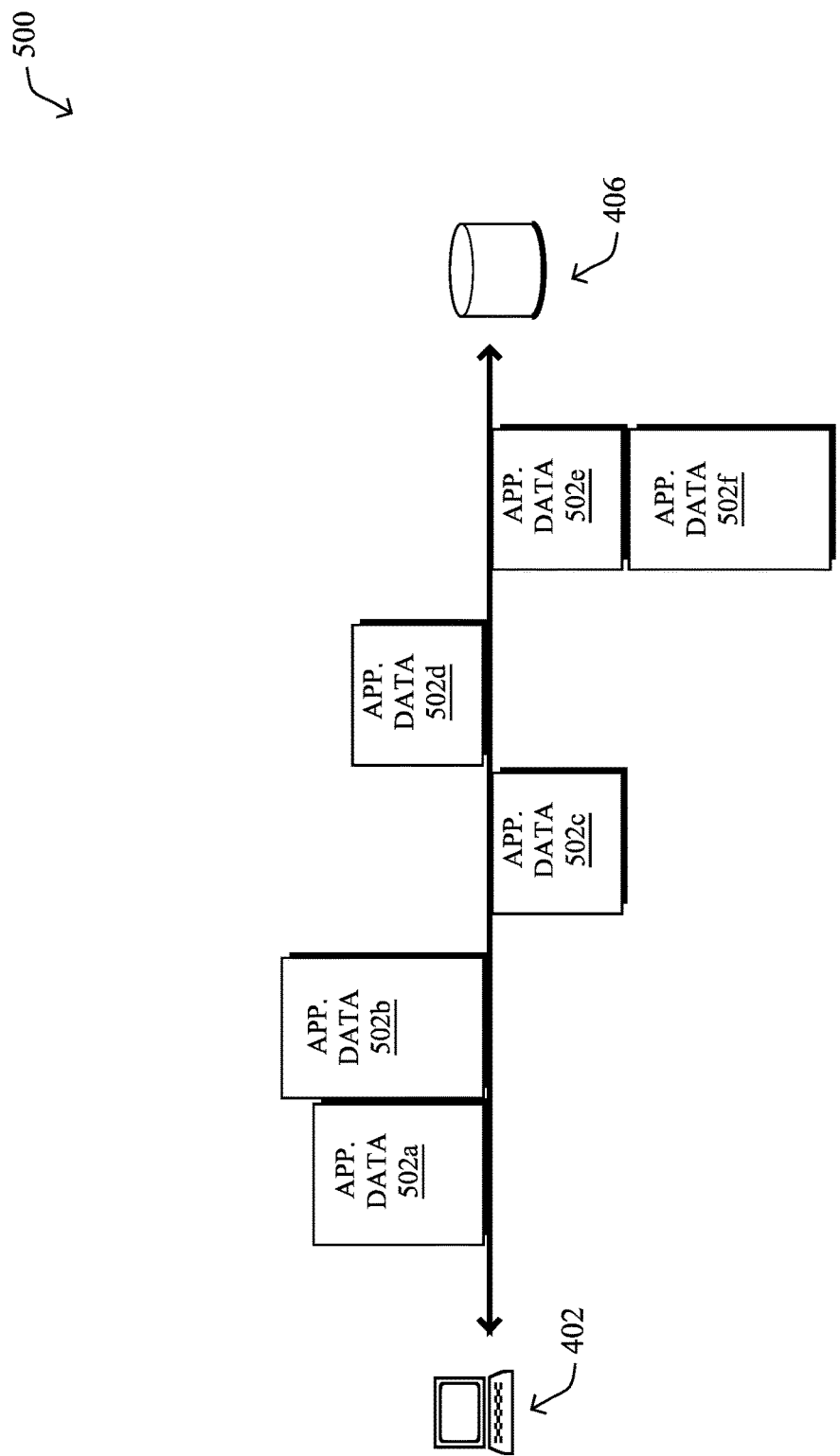
FIGS. 5A-5B illustrate an example of the examination of Transport Layer Security (TLS) traffic.
Figure 5B:
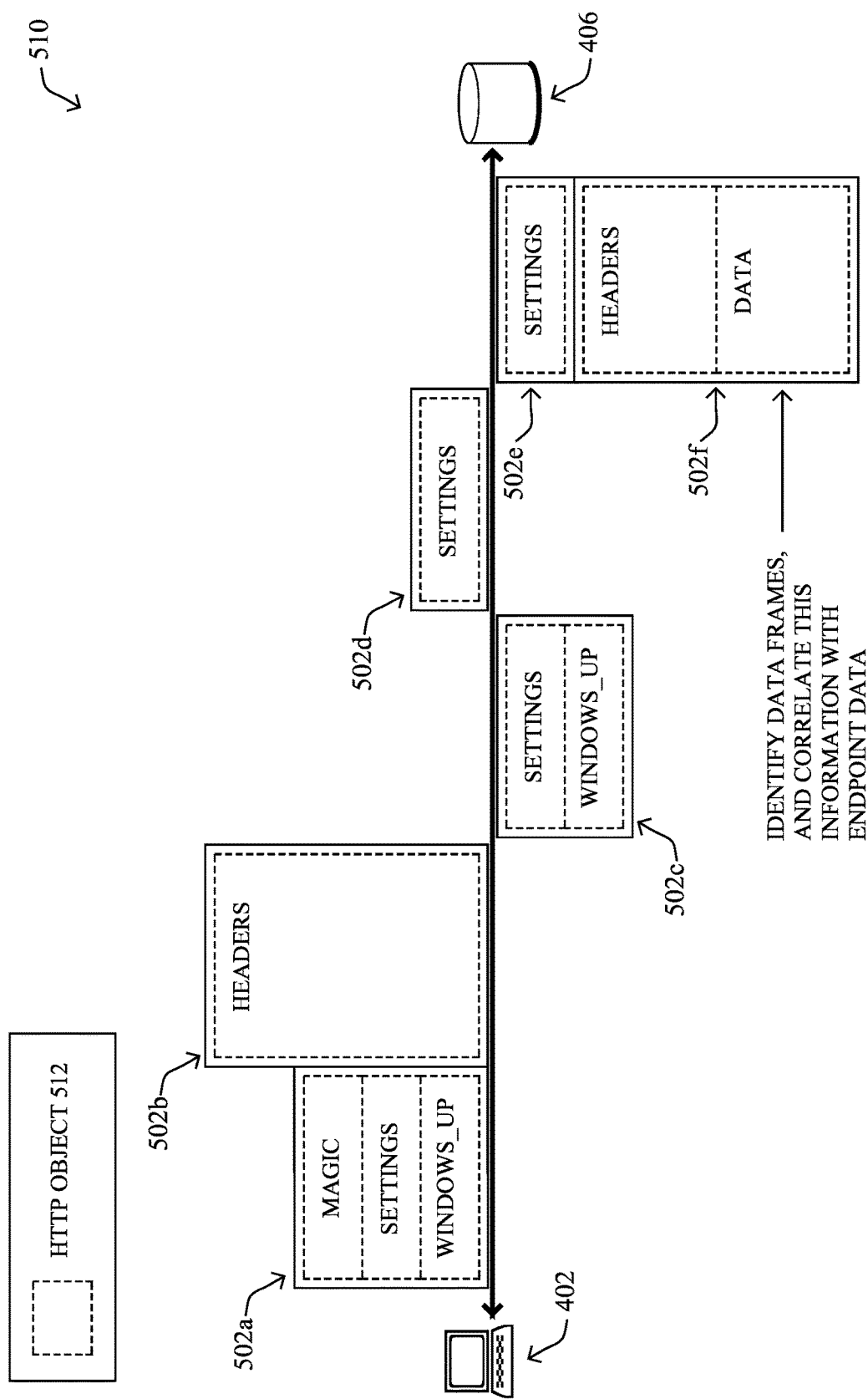

FIGS. 5A-5B illustrate examples of Transport Layer Security (TLS) traffic, in various embodiments. FIG. 5A illustrates an example 500 of TLS application records 502a-502f that may be observed in a TLS session between endpoint devices 402 and 406. Through classification of the observable features/characteristics of these records, using the above classification techniques, traffic analysis service 408 is able to infer/label these records with the types of HTTP objects that they contain. For example, in example 510 shown in FIG. 5B, each of the TLS application records 502a-502f from FIG. 5A may be classified and labeled according to the HTTP objects 512 that they contain. Said differently, inferences can be made by traffic analysis service 408 about the content of the encrypted traffic, without having to actually decrypt the traffic, based on its observable characteristics.

Once traffic analysis service 408 has labeled the TLS records with the types of HTTP objects that they contain, for each TLS ciphertext record, traffic analysis service 408 may predict the length of the corresponding TLS plaintext records. For example, this prediction may be based on knowledge of the cryptographic parameters of the TLS records (e.g., nonce, message authentication code, etc.) and HTTP artifacts (e.g., HTTP/2 DATA record headers, etc.). The sizes can then be merged following the rules of the HTTP pipelining, thereby inferring the file size of the file being conveyed, which can be correlated with the file information from the endpoint, to identify the particular file within the encrypted traffic.

Figure 6A:
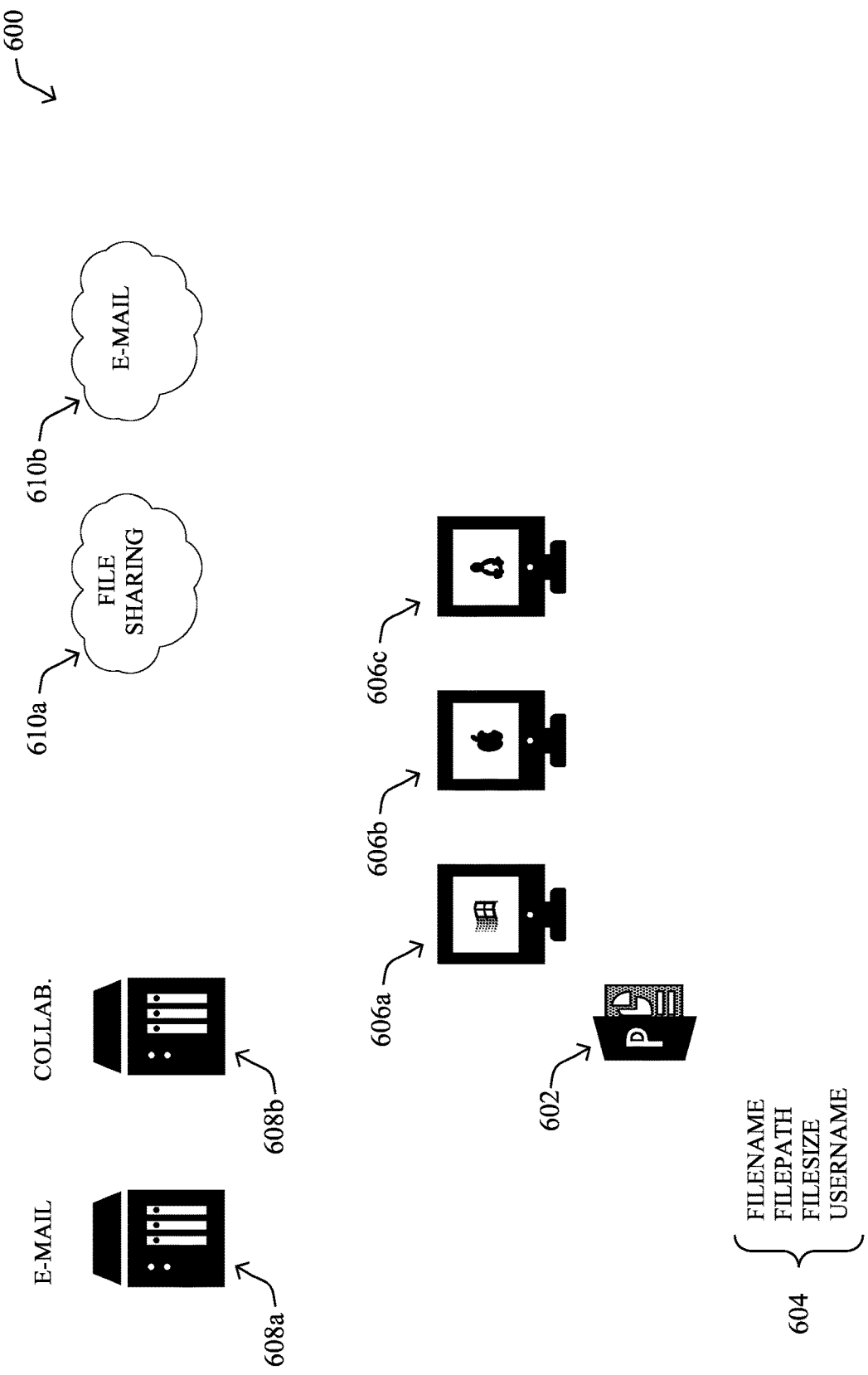
FIGS. 6A-6E illustrate an example of detecting and preventing data exfiltration in an enterprise environment.

FIGS. 6A-6E illustrate an example of detecting and preventing data exfiltration in an enterprise environment 600. As shown in FIG. 6A, enterprise environment 600 may include any number of endpoint clients 606, such as endpoint clients 606a-606c. In addition, enterprise environment 600 may also include any number of endpoint servers 608, such as an e-mail server 608a, a collaboration server 608b, or the like. There may also be any number of external services 610 outside of the local network of the enterprise, such as an external file sharing service 610a, an external e-mail service 610b, etc.

For purposes of illustration of the techniques herein, assume that a particular file 602 is created on endpoint client 606a. File 602 may have any number of file characteristics 604, such as a filename, filepath, filesize, creator username, etc. In various embodiments, an agent executing on endpoint client 606a can capture this file characteristic data and report it to a monitoring service in the network.

Figure 6B:
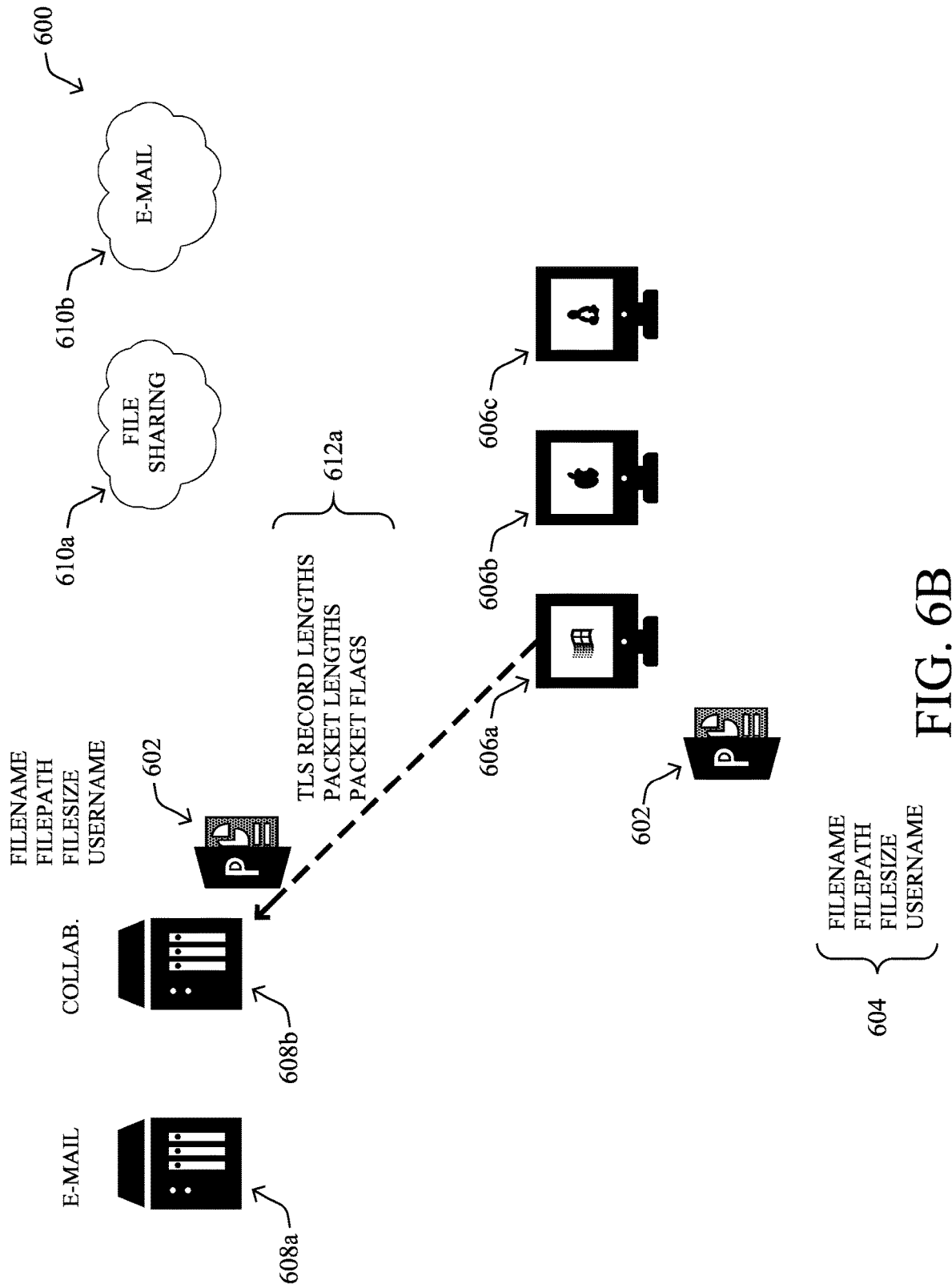

In FIG. 6B, now assume that endpoint client 606a sends a copy of file 602 to collaboration service 608b via encrypted traffic. Using the techniques herein, traffic data 612a regarding this encrypted traffic can be captured and reported to the monitoring service. For example, the traffic data may indicate the TLS record lengths, packet lengths, packet flags, etc. of the encrypted traffic. In some embodiments, the service may use traffic data 612a to infer characteristics of the content of the encrypted traffic and, by comparing the inferred characteristics to file characteristics 604, detect the file within the encrypted traffic. However, assume that this upload to collaboration server 608b internal to the enterprise network is allowed by policy.

Figure 6C:
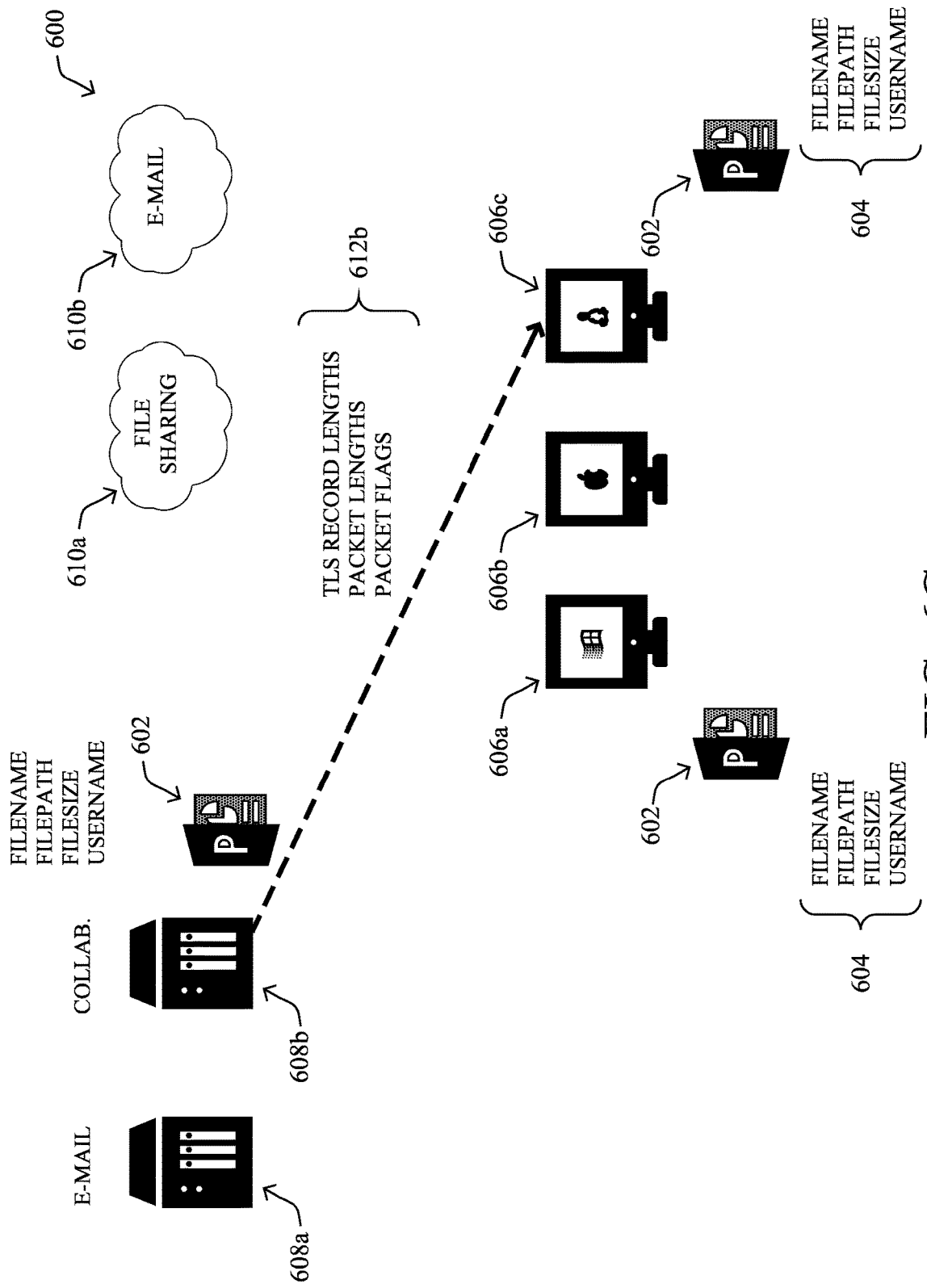

In FIG. 6C, assume now that endpoint client 606c then downloads a copy of file 602 from collaboration server 608b. Again, the service may capture the traffic data 612b regarding the resulting encrypted traffic and determine that the download is authorized by policy.

Figure 6D:
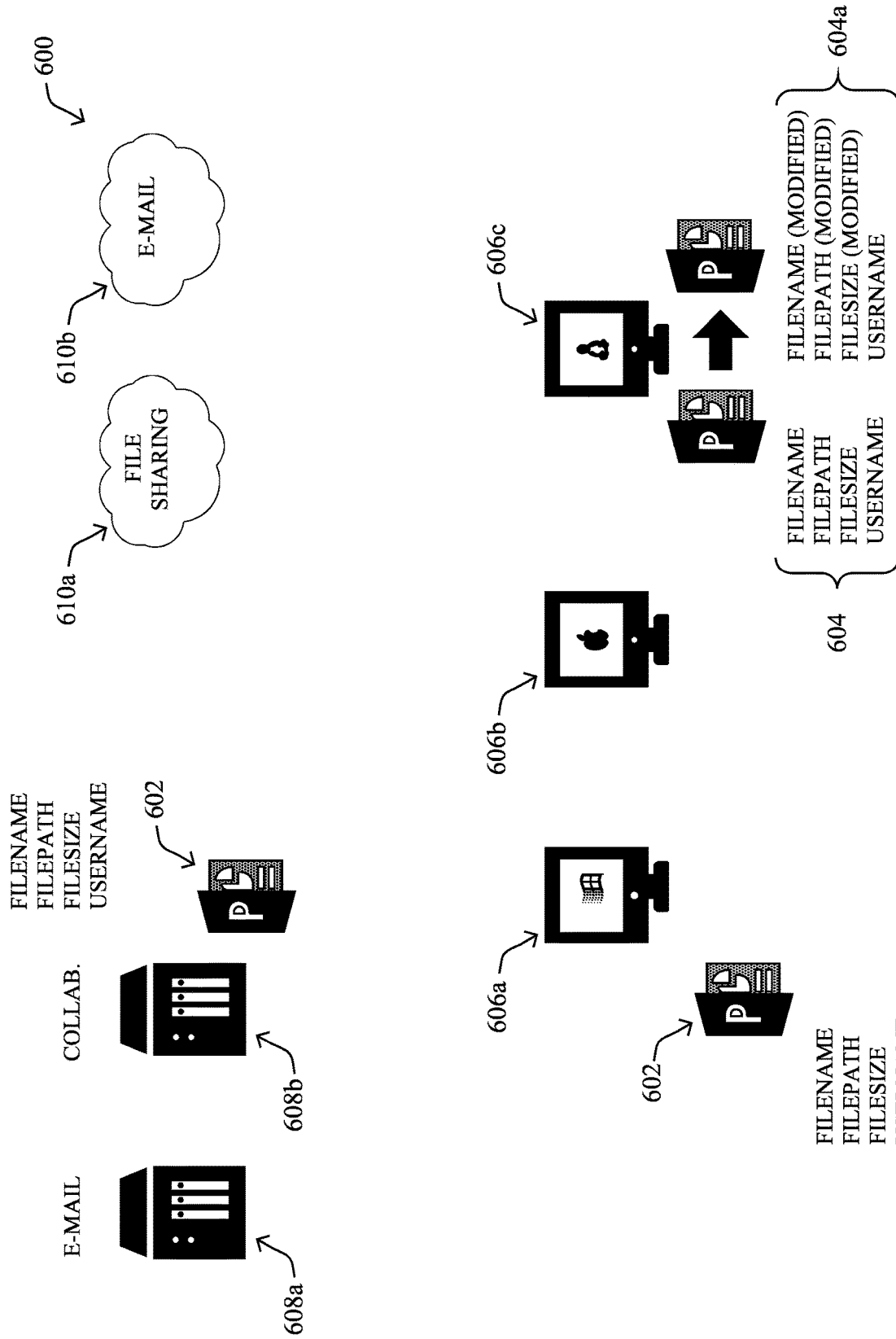

In FIG. 6D, now assume that the user of endpoint client 606c modifies file 602, thereby changing the file characteristics 604 into file characteristics 604a. These change may be captured by the agent executed by endpoint client 606c and sent to the network monitoring service, thereby tracking changes to the file over time.

Figure 6E:
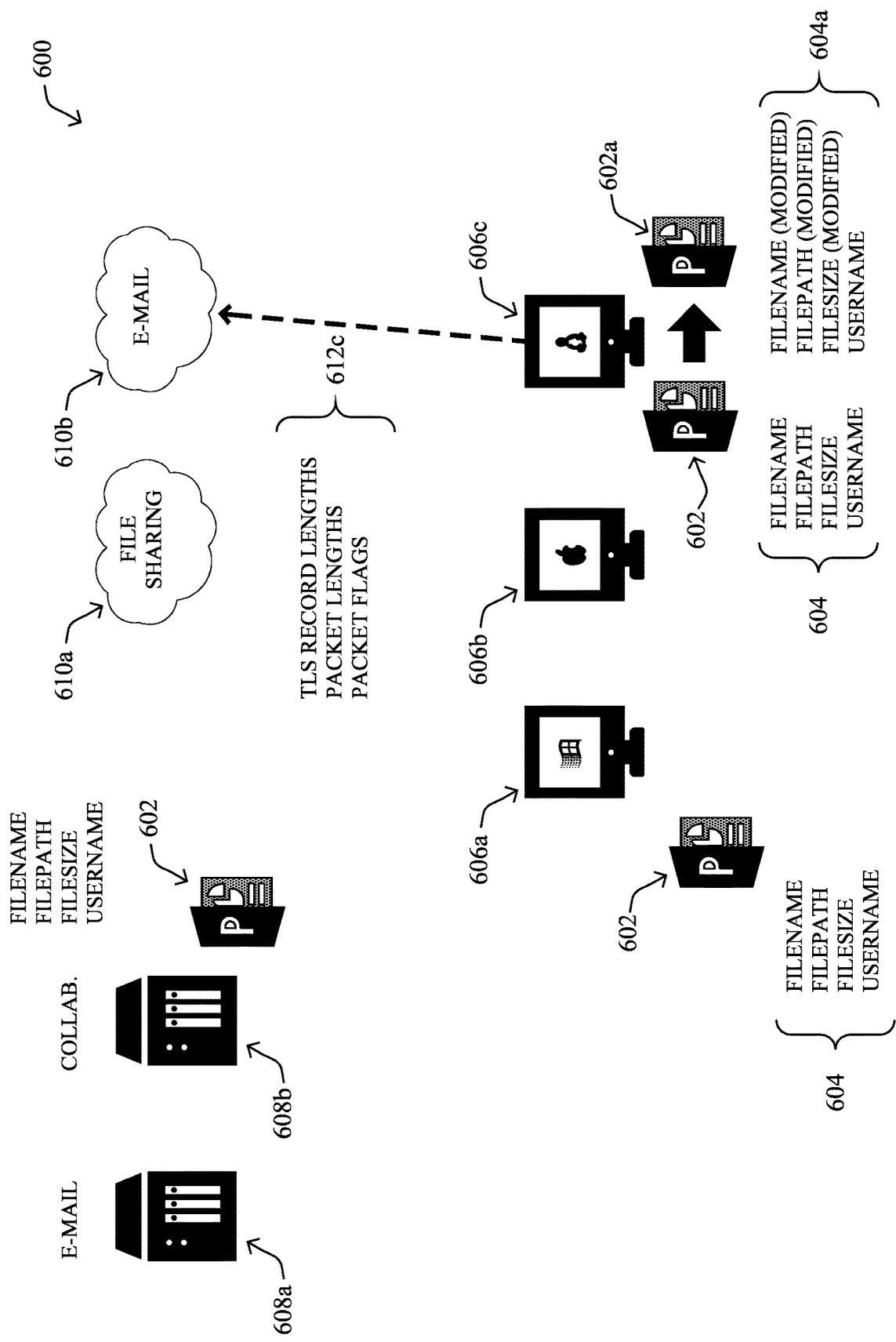

In FIG. 6E, now assume that endpoint client 606c attempts to upload the modified file 602 to external email service 610b, which is a policy violation. For example, assume that file 602 includes personally identifiable information that can be shared on the internal network of the enterprise, but is prohibited by policy from being sent externally. As part of this upload, the monitoring service may receive traffic data 612c regarding the encrypted traffic between endpoint client 606c and e-mail service 610b. Thus, by comparing the inferred characteristics of the encrypted content from traffic data 612c to the file characteristics 604a captured by the agent on endpoint client 606c, the service may determine that the encrypted traffic includes the file, which is a policy violation. In turn, the service may enforce the policy by initiating any number of corrective measures, such as blocking the upload, sending an alert to an administrator, etc.

The techniques herein have been implemented in a working model. Preliminary testing of the working model indicates that it can identify the exact file size for files that are less than 1 MB transferred over TLS using a stream cipher. For larger files (e.g., up to tens of MBs) or block ciphers, the resulting file size estimate is within 128-256 bytes. Experiments on per-endpoint file size diversity indicate that file size is enough to identify files for all but a specific set of sizes related to common system files.

Figure 7:
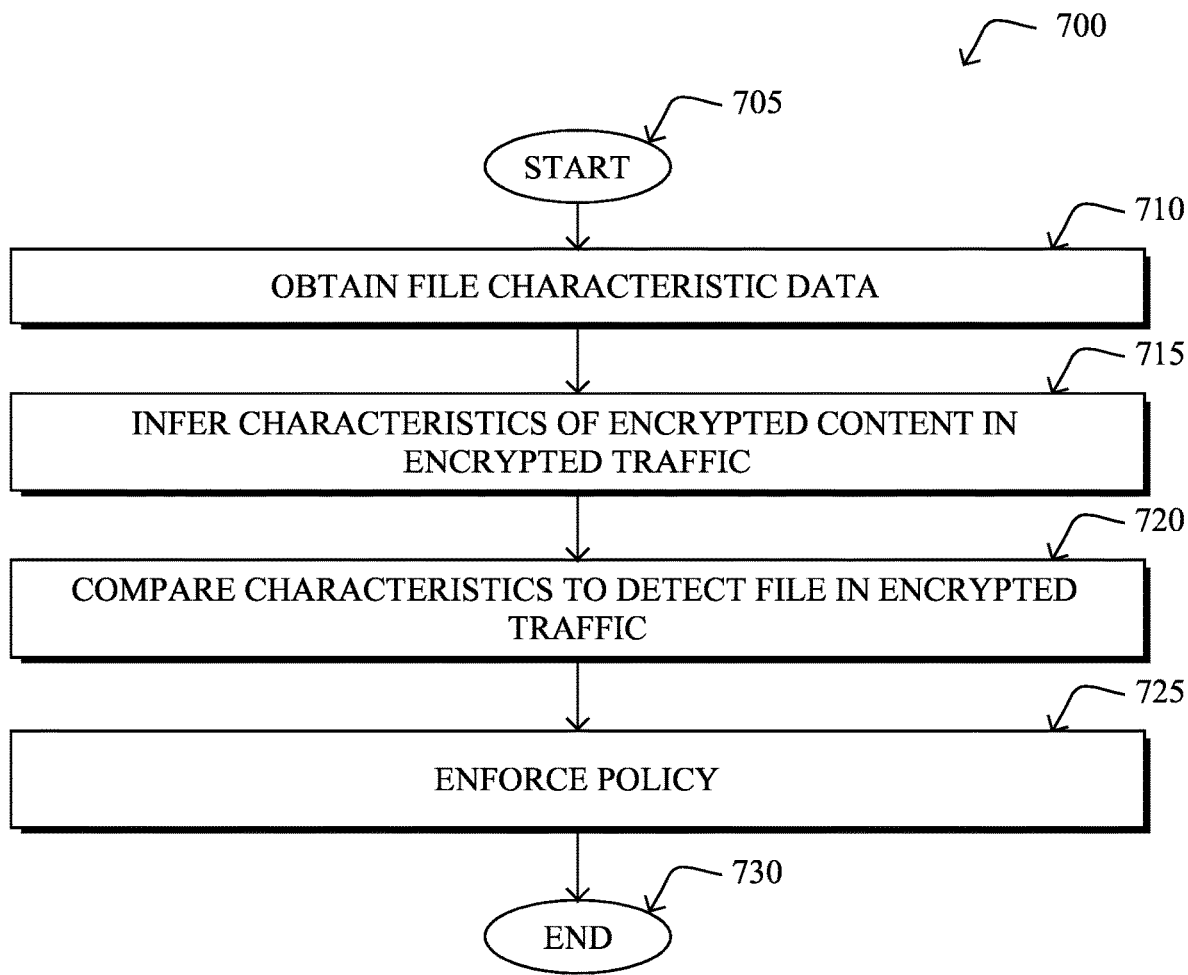
FIG. 7 illustrates an example simplified procedure for detecting targeted data exfiltration in encrypted traffic.

FIG. 7 illustrates an example simplified procedure for detecting targeted data exfiltration in encrypted traffic, in accordance with one or more embodiments described herein. For example, a non-generic, specifically configured device (e.g., device 200) that provides a monitoring service to a network, may perform procedure 700 by executing stored instructions (e.g., process 248). The procedure 700 may start at step 705, and continues to step 710, where, as described in greater detail above, the service may obtain file characteristic data of a file stored on a first endpoint in the network. In various embodiments, the service may receive the file characteristics data from an agent executed by an endpoint in the network at which the file is stored. Such characteristic data may include, but is not limited to, the file size of the file, a user identifier associated with the endpoint, a user identifier associated with an endpoint to which the file is sent, a file name of the file, or a file directory on the endpoint in which the file is stored. In further cases, the file characteristic data may include information set regarding the sensitivity of the file, such as whether the file includes personally identifiable information, whether the file should be protected from being sent to a location external to the network, etc.

At step 715, as detailed above, the service may infer characteristics of encrypted content within encrypted traffic in the network between the endpoint in the network and a second endpoint. In various embodiments, the service may infer the characteristics of the encrypted content by applying a machine learning-based classifier to traffic data regarding the encrypted traffic session. Such traffic data may include, but is not limited to, Transport Layer Security (TLS) record lengths, timing information, Transmission Control Protocol (TCP) flags, and the like. For example, in some embodiments, the classifier may assess the TLS application records, to infer the type of HTTP object within a given record. By leveraging a training dataset of known plaintext content and their corresponding encrypted traffic, the classifier can also be trained to infer the plaintext size of the encrypted content, in further embodiments.

At step 720, the service may compare the file characteristic data of the file to the inferred content characteristics of the encrypted content within the encrypted traffic, to detect the file within the encrypted traffic, as described in greater detail above. For example, the service may compare the inferred file size within the encrypted traffic to the file size reported by the endpoint agent and, if the two match, determine that the endpoint is attempting to send the file via the encrypted traffic to the second endpoint.

At step 725, as detailed above, the service may enforce a network policy in the network, based on the detection of the file within the encrypted traffic. In various embodiments, the network policy may be based on any or all of the following: a user identifier associated with the first endpoint, a user identifier associated with the second endpoint, a file name of the file, a file directory on the first endpoint in which the file is stored, whether or not the file includes personally identifiable information (PII), the first and/or send endpoints, or the like. Enforcement of the policy may take any number of forms, depending on the sensitivity of the file and/or severity of the policy violation. For example, the service may simply send an alert to an administrator or may take more extreme measures, such as blocking the encrypted traffic, redirecting the encrypted traffic, etc. For serious policy violations, the service may even block all traffic associated with the first endpoint and/or the second endpoint. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the detection of data file exfiltration within encrypted network traffic. In various aspects, the techniques herein can be performed without requiring the decryption of the traffic, which may be prohibited for privacy or legal reasons. In further aspects, the techniques herein can be used to track the movement of particular files sent through a network via encrypted traffic. When a policy violation is detected, mitigation actions can be taken, to ensure that sensitive data is not disseminated to unauthorized users or devices.

While there have been shown and described illustrative embodiments that provide for the detection of data file exfiltration within encrypted network traffic, it is to be understood that various other adaptations and modifications may be made within the spirit and scope of the embodiments herein. For example, while certain embodiments are described herein with respect to using certain models for purposes of classifying encrypted traffic, the models are not limited as such and may be used for other functions, in other embodiments. In addition, while certain protocols are shown, such as TLS, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
 obtaining, by a service that monitors a network, file characteristic data of a particular file that specifically identifies the particular file from among a plurality of files stored on a first endpoint in the network, wherein the file characteristic data is indicative of one or more of: a file size of the particular file, a file name of the particular file, a file hash of the particular file, a location at which the particular file is stored on the first endpoint, a user identifier associated with the first endpoint, a user identifier associated with a second endpoint in communication with the first endpoint, an identifier associated with a creator of the particular file, or whether the particular file includes sensitive information;

inferring, by the service, characteristics of encrypted content within encrypted traffic in the network between the first endpoint and the second endpoint, by applying a machine learning-based classifier to traffic data regarding the encrypted traffic;

detecting, by the service, whether the particular file is included within the encrypted traffic, without decrypting the encrypted traffic, by comparing the file characteristic data to the inferred characteristics of the encrypted content to determine whether the inferred characteristics of the encrypted content match the file characteristic data of the particular file sufficiently to specifically identify the particular file from among the plurality of files stored on the first endpoint in the network; and in response to detecting the particular file within the encrypted traffic, enforcing, by the service, a network policy in the network.

2. The method as in claim 1, wherein enforcing the network policy comprises at least one of: blocking the encrypted traffic in the network, slowing the encrypted traffic in the network, or redirecting the encrypted traffic in the network.

3. The method as in claim 1, wherein enforcing the network policy comprises at least one of: blocking all traffic in the network associated with the first endpoint or blocking all traffic in the network associated with the second endpoint.

4. The method as in claim 1, wherein inferring the characteristics of the encrypted content within the encrypted traffic in the network by applying the machine learning-based classifier to the traffic data regarding the encrypted traffic comprises:

using the traffic data to classify a particular application record of the encrypted traffic as including a Hypertext Transfer Protocol (HTTP) data object; and predicting, by the classifier, a plaintext data size from the HTTP data object.

5. The method as in claim 4, wherein the file characteristic data is indicative of the file size of the particular file, and wherein comparing the file characteristic data to the inferred characteristics of the encrypted content comprises:

comparing the file size of the particular file to the plaintext data size.

6. The method as in claim 1, wherein the network policy is enforced based in part on the file characteristic data.

7. The method as in claim 1, wherein obtaining the file characteristic data comprises:

receiving, at the service, the file characteristic data from a monitoring agent executed by the first endpoint.

8. The method as in claim 1, wherein enforcing the network policy in the network comprises:

determining, by the service and based on the file characteristic data, whether the particular file includes personally identifiable information.

9. The method as in claim 1, wherein the traffic data regarding the encrypted traffic comprises one or more of: Transport Layer Security (TLS) record lengths, timing information, or Transmission Control Protocol (TCP) flags.

10. The method as in claim 1, wherein the network policy is enforced based in part on a sensitivity of the particular file.

11. An apparatus, comprising:
one or more network interfaces to communicate with a network;
a processor coupled to the one or more network interfaces and configured to execute a process; and
a memory configured to store a process executable by the processor, the process when executed configured to:
obtain file characteristic data of a particular file that specifically identifies the particular file from among a plurality of files stored on a first endpoint in the network, wherein the file characteristic data is indicative of one or more of: a file size of the particular file, a file name of the particular file, a file hash of the particular file, a location at which the particular file is stored on the first endpoint, a user identifier associated with the first endpoint, a user identifier associated with a second endpoint in communication with the first endpoint, an identifier associated with a creator of the particular file, or whether the particular file includes sensitive information;

infer characteristics of encrypted content within encrypted traffic in the network between the first endpoint and the second endpoint, by applying a machine learning-based classifier to traffic data regarding the encrypted traffic;

detecting whether the particular file is included within the encrypted traffic, without decrypting the encrypted traffic, by comparing the file characteristic data to the inferred characteristics of the encrypted content to determine whether the inferred characteristics of the encrypted content match the file characteristic data of the particular file sufficiently to specifically identify the particular file from among the plurality of files stored on the first endpoint in the network; and in response to detecting the particular file within the encrypted traffic, enforce a network policy in the network.

12. The apparatus as in claim 11, wherein enforcing the network policy comprises at least one of: blocking the encrypted traffic in the network, slowing the encrypted traffic in the network, or redirecting the encrypted traffic in the network.

13. The apparatus as in claim 11, wherein enforcing the network policy comprises at least one of: blocking all traffic in the network associated with the first endpoint or blocking all traffic in the network associated with the second endpoint.

14. The apparatus as in claim 11, wherein inferring the characteristics of the encrypted content within the encrypted traffic in the network by applying the machine learning-based classifier to the traffic data regarding the encrypted traffic comprises:

using the traffic data to classify a particular application record of the encrypted traffic as including a Hypertext Transfer Protocol (HTTP) data object; and predicting, by the machine learning-based classifier, a plaintext data size from the HTTP data object.

15. The apparatus as in claim 14, wherein the file characteristic data is indicative of the file size of the particular file, and wherein comparing the file characteristic data to the inferred characteristics of the encrypted content comprises:

comparing the file size of the particular file to the plaintext data size.

16. The apparatus as in claim 11, wherein the network policy is enforced based in part on the file characteristic data.

17. The apparatus as in claim 11, wherein the apparatus obtains the file characteristic data by:

receive the file characteristic data from a monitoring agent executed by the first endpoint.

18. The apparatus as in claim 11, wherein the apparatus enforces the network policy in the network by:

determining whether the first endpoint is infected with malware.

19. The apparatus as in claim 11, wherein the traffic data regarding the encrypted traffic comprises one or more of: Transport Layer Security (TLS) record lengths, timing information, or Transmission Control Protocol (TCP) flags.

20. A tangible, non-transitory, computer-readable medium storing program instructions that cause a service that monitors a network to execute a process comprising:

obtaining, by the service, file characteristic data of a particular file that specifically identifies the particular file from among a plurality of files stored on a first endpoint in the network, wherein the file characteristic data is indicative of one or more of: a file size of the particular file, a file name of the particular file, a file hash of the particular file, a location at which the particular file is stored on the first endpoint, a user identifier associated with the first endpoint, a user identifier associated with a second endpoint in communication with the first endpoint, an identifier associated with a creator of the particular file, or whether the particular file includes sensitive information;

inferring, by the service, characteristics of encrypted content within encrypted traffic in the network between the first endpoint and the second endpoint, by applying a machine learning-based classifier to traffic data regarding the encrypted traffic;

detecting, by the service, whether the particular file is included within the encrypted traffic, without decrypting the encrypted traffic, by comparing the file characteristic data to the inferred characteristics of the encrypted content to determine whether the inferred characteristics of the encrypted content match the file characteristic data of the particular file sufficiently to specifically identify the particular file from among the plurality of files stored on the first endpoint in the network; and in response to detecting the particular file within the encrypted traffic, enforcing, by the service, a network policy in the network.

\* \* \* \* \*

UNITED STATES PATENT AND TRADEMARK OFFICE
CERTIFICATE OF CORRECTION

PATENT NO. : 12,126,653 B2
APPLICATION NO. : 17/107350
DATED : October 22, 2024
INVENTOR(S) : Blake Harrell Anderson et al.

Page 1 of 1

It is certified that error appears in the above-identified patent and that said Letters Patent is hereby corrected as shown below:

In the Specification

Column 4, Line 1 please amend as shown:
3.) Site Type C: a site of type B (e.g., types B1, B2, or B3)

Column 13, Line 4 please amend as shown:
less than 1MB transferred over TLS using a stream cipher.

Signed and Sealed this
Twenty-first Day of January, 2025

Coke Morgan Stewart
*Acting Director of the United States Patent and Trademark Office*